US00RE46827E

(19) United States
(12) Reissued Patent
Rudolph et al.

(10) Patent Number: US RE46,827 E
(45) Date of Reissued Patent: May 8, 2018

(54) HYBRID IMPACT TOOL WITH TWO-SPEED TRANSMISSION

(71) Applicant: BLACK & DECKER INC., New Britain, CT (US)

(72) Inventors: Scott Rudolph, Aberdeen, MD (US); Sankarshan Murthy, Mountain View, CA (US); Daniel Puzio, Baltimore, MD (US); Qiang Zhang, Lutherville, MD (US); Aris Cleanthous, Baltimore, MD (US); Mehdi Abolhassani, Houston, TX (US); Ren H. Wang, Perry Hall, MD (US); David Tomayko, Ellicott City, MD (US)

(73) Assignee: Black & Decker Inc., New Britian, CT (US)

(21) Appl. No.: 14/732,133

(22) Filed: Jun. 5, 2015

Related U.S. Patent Documents

Reissue of:
(64) Patent No.: 8,460,153
Issued: Jun. 11, 2013
Appl. No.: 12/971,940
Filed: Dec. 17, 2010

U.S. Applications:
(60) Provisional application No. 61/289,780, filed on Dec. 23, 2009, provisional application No. 61/290,759, filed on Dec. 29, 2009.

(51) Int. Cl.
*F16H 3/44* (2006.01)
*F16H 57/08* (2006.01)
(Continued)

(52) U.S. Cl.
CPC ..... *B25F 5/001* (2013.01); *B25B 21/02* (2013.01)

(58) Field of Classification Search
CPC ..... B25B 19/00; B25B 21/00; B25B 21/008; B25B 21/002; B25B 21/02; B25F 5/001
See application file for complete search history.

(56) References Cited

U.S. PATENT DOCUMENTS 3,195,702 A 7/1965 Alexander
3,207,237 A 9/1965 Wanner
(Continued)

FOREIGN PATENT DOCUMENTS

DE 1949415 A1 10/1970
DE 1652685 A1 12/1970
(Continued)

*Primary Examiner* — Jeffrey L Gellner
(74) *Attorney, Agent, or Firm* — Scott B. Markow

(57) ABSTRACT

A power tool that includes a housing, a motor, a planetary transmission, a first bearing and a second bearing. The motor is disposed in the housing and includes an output shaft. The planetary transmission has a sun gear, a plurality of first planet gears, a first ring gear and a carrier. The sun gear is driven by the output shaft. The first planet gears are driven by the sun gear and have teeth that are meshingly engaged to teeth of the first ring gear. The carrier includes a rear carrier plate and a front carrier plate between which the first and second planet gears are received. The rear carrier plate includes a first bearing aperture. The first bearing is received in the first bearing aperture and is configured to support the output shaft. The second bearing is received onto the rear carrier plate to support the carrier relative to the housing.

45 Claims, 16 Drawing Sheets

(51) Int. Cl.
*B25B 21/02* (2006.01)
*B25F 5/00* (2006.01)

(56) References Cited

U.S. PATENT DOCUMENTS

| | | | | |
|---|---|---|---|---|
| 3,584,695 | A | 6/1971 | Turnbull | |
| 3,648,784 | A | 3/1972 | Schoeps | |
| 3,710,873 | A | 1/1973 | Allen | |
| 3,741,313 | A | 6/1973 | States | |
| 4,428,438 | A | 1/1984 | Holzer | |
| 4,986,369 | A | 1/1991 | Fushiya et al. | |
| 5,025,903 | A | 6/1991 | Elligson | |
| 5,080,180 | A | 1/1992 | Hansson | |
| 5,269,733 | A * | 12/1993 | Anthony, III | B25B 21/026 173/171 |
| 5,447,205 | A | 9/1995 | Thurler | |
| 5,457,860 | A | 10/1995 | Miranda | |
| 5,458,206 | A | 10/1995 | Bourner et al. | |
| 5,474,139 | A | 12/1995 | Odendahl et al. | |
| 5,673,758 | A | 10/1997 | Sasaki et al. | |
| 5,692,575 | A * | 12/1997 | Hellstrom | B25B 21/00 173/216 |
| 5,706,902 | A | 1/1998 | Eisenhardt | |
| 5,711,380 | A | 1/1998 | Chen | |
| 5,836,403 | A | 11/1998 | Putney et al. | |
| 5,842,527 | A | 12/1998 | Arakawa et al. | |
| 5,868,208 | A | 2/1999 | Peisert et al. | |
| 6,135,212 | A | 10/2000 | Georgiou | |
| 6,142,242 | A | 11/2000 | Okumura et al. | |
| 6,176,321 | B1 | 1/2001 | Arakawa et al. | |
| 6,196,330 | B1 | 3/2001 | Matthias et al. | |
| 6,223,833 | B1 | 5/2001 | Thurler et al. | |
| D462,594 | S | 9/2002 | Flickinger | |
| 6,457,535 | B1 | 10/2002 | Tanaka | B25B 21/00 173/178 |
| 6,457,635 | B1 | 10/2002 | Scicluna | |
| 6,535,212 | B1 | 3/2003 | Goto et al. | |
| 6,535,636 | B1 | 3/2003 | Savakis et al. | |
| 6,691,796 | B1 | 2/2004 | Wu | |
| 6,796,921 | B1 * | 9/2004 | Buck | B25F 5/001 173/47 |
| 6,805,207 | B2 | 10/2004 | Hagan et al. | |
| 6,834,730 | B2 | 12/2004 | Gass et al. | |
| 6,857,983 | B2 * | 2/2005 | Milbourne et al. | 475/269 |
| 6,887,176 | B2 | 5/2005 | Sasaki | |
| 6,892,827 | B2 | 5/2005 | Toyama et al. | |
| 6,938,526 | B2 | 9/2005 | Milbourne et al. | |
| 6,976,545 | B2 | 12/2005 | Greitmann | |
| 7,032,683 | B2 | 4/2006 | Hetcher et al. | |
| 7,036,406 | B2 | 5/2006 | Milbourne et al. | |
| 7,048,075 | B2 | 5/2006 | Saito et al. | |
| 7,073,605 | B2 | 7/2006 | Saito et al. | |
| 7,073,608 | B2 | 7/2006 | Droste | |
| 7,086,483 | B2 | 8/2006 | Arimura et al. | |
| 7,093,668 | B2 | 8/2006 | Gass et al. | |
| 7,101,300 | B2 | 9/2006 | Milbourne et al. | |
| 7,121,358 | B2 | 10/2006 | Gass et al. | |
| 7,124,839 | B2 | 10/2006 | Furuta et al. | |
| 7,131,503 | B2 | 11/2006 | Furuta et al. | |
| 7,201,235 | B2 | 4/2007 | Umemura et al. | |
| 7,207,393 | B2 | 4/2007 | Clark, Jr. et al. | |
| 7,213,659 | B2 | 5/2007 | Saito et al. | |
| 7,216,749 | B2 | 5/2007 | Droste | |
| 7,223,195 | B2 | 5/2007 | Milbourne et al. | |
| 7,225,884 | B2 | 6/2007 | Aeberhard | |
| 7,232,400 | B2 * | 6/2007 | Hill | 475/299 |
| 7,249,638 | B2 | 7/2007 | Bodine et al. | |
| 7,306,049 | B2 | 12/2007 | Soika et al. | |
| 7,308,948 | B2 | 12/2007 | Furuta | |
| 7,314,097 | B2 | 1/2008 | Jenner et al. | |
| 7,322,427 | B2 | 1/2008 | Shimma et al. | |
| 7,328,752 | B2 | 2/2008 | Gass et al. | |
| 7,331,408 | B2 | 2/2008 | Arich et al. | |
| 7,331,496 | B2 | 2/2008 | Britz et al. | |
| 7,410,007 | B2 | 8/2008 | Chung et al. | |
| 2002/0094907 | A1 | 7/2002 | Elger | |
| 2003/0146007 | A1 | 8/2003 | Greitmann | |
| 2004/0245005 | A1 | 12/2004 | Toyama et al. | |
| 2005/0028997 | A1 | 2/2005 | Hagan et al. | |
| 2005/0032604 | A1 | 2/2005 | Hill | |
| 2005/0061521 | A1 | 3/2005 | Saito et al. | |
| 2005/0263303 | A1 | 12/2005 | Shimizu et al. | |
| 2005/0263304 | A1 | 12/2005 | Sainomoto et al. | |
| 2005/0263305 | A1 | 12/2005 | Shimizu et al. | |
| 2006/0006614 | A1 | 1/2006 | Buchholz et al. | |
| 2006/0021771 | A1 | 2/2006 | Milbourne et al. | |
| 2006/0086514 | A1 | 4/2006 | Aeberhard | |
| 2006/0090913 | A1 | 5/2006 | Furuta | |
| 2006/0213675 | A1 | 9/2006 | Whitmire et al. | |
| 2006/0237205 | A1 | 10/2006 | Sia et al. | |
| 2006/0254786 | A1 | 11/2006 | Murakami et al. | |
| 2006/0254789 | A1 | 11/2006 | Murakami et al. | |
| 2006/0266537 | A1 | 11/2006 | Izumisawa | |
| 2007/0056756 | A1 | 3/2007 | Chung et al. | |
| 2007/0068692 | A1 | 3/2007 | Puzio | |
| 2007/0068693 | A1 | 3/2007 | Whitmire et al. | |
| 2007/0072732 | A1 * | 3/2007 | Klemen | 475/280 |
| 2007/0074883 | A1 | 4/2007 | Strasser et al. | |
| 2007/0084614 | A1 | 4/2007 | Whitmire et al. | |
| 2007/0174645 | A1 | 7/2007 | Lin | |
| 2007/0181319 | A1 | 8/2007 | Whitmine et al. | |
| 2007/0201748 | A1 | 8/2007 | Bixler et al. | |
| 2007/0266545 | A1 | 11/2007 | Bodine et al. | |
| 2008/0035360 | A1 | 2/2008 | Furuta | |
| 2008/0041602 | A1 | 2/2008 | Furuta | |
| 2008/0308286 | A1 | 12/2008 | Puzio | |
| 2010/0071923 | A1 | 3/2010 | Rudolph et al. | |

FOREIGN PATENT DOCUMENTS

| | | | |
|---|---|---|---|
| DE | 1941093 | A1 | 4/1971 |
| DE | 2557118 | A1 | 6/1977 |
| DE | 4038502 | A1 | 6/1992 |
| DE | 4328599 | A1 | 3/1994 |
| DE | 9404069 | U1 | 6/1994 |
| DE | 9406626 | U1 | 6/1994 |
| DE | 19954931 | A1 | 6/2001 |
| DE | 20209356 | U1 | 10/2002 |
| DE | 20304314 | U1 | 7/2003 |
| DE | 20305853 | U1 | 9/2003 |
| DE | 102004037072 | B3 | 1/2006 |
| EP | 0394604 | A2 | 10/1990 |
| EP | 0404035 | A2 | 12/1990 |
| EP | 0808695 | A2 | 11/1997 |
| EP | 1621290 | A1 | 2/2006 |
| EP | 1652630 | A2 | 5/2006 |
| EP | 1707322 | A1 | 10/2006 |
| GB | 1574652 | A | 9/1980 |
| GB | 2102718 | A | 2/1983 |
| GB | 2274416 | A | 7/1994 |
| GB | 2328635 | A | 3/1999 |
| GB | 2334909 | A | 9/1999 |
| GB | 2404891 | A | 2/2005 |
| JP | 62173180 | A | 7/1987 |
| JP | 62297007 | A | 12/1987 |
| JP | 63123678 | A | 5/1988 |
| JP | 2139182 | A | 5/1990 |
| JP | 2284881 | A | 11/1990 |
| JP | 3043164 | A | 2/1991 |
| JP | 3168363 | A | 7/1991 |
| JP | 6010844 | A | 1/1994 |
| JP | 6023923 | A | 2/1994 |
| JP | 6182674 | A | 7/1994 |
| JP | 6210507 | A | 8/1994 |
| JP | 6215085 | A | 8/1994 |
| JP | 07040258 | A | 2/1995 |
| JP | 7080711 | A | 3/1995 |
| JP | 7328955 | A | 12/1995 |
| JP | 9136273 | A | 5/1997 |
| JP | 9239675 | A | 9/1997 |
| JP | 10291173 | A | 11/1998 |
| JP | 3655481 | A | 8/2000 |
| JP | 2000233306 | A | 8/2000 |
| JP | 2000246659 | A | 9/2000 |

(56) References Cited

FOREIGN PATENT DOCUMENTS

| | | | |
|---|---|---|---|
| JP | 2001009746 | A | 1/2001 |
| JP | 2001088051 | A | 4/2001 |
| JP | 2001088052 | A | 4/2001 |
| JP | 2001105214 | A | 4/2001 |
| JP | 2002059375 | A | 2/2002 |
| JP | 2002178206 | A | 6/2002 |
| JP | 2002224971 | A | 8/2002 |
| JP | 2002273666 | A | 9/2002 |
| JP | 2003071745 | A | 3/2003 |
| JP | 2004130474 | A | 4/2004 |
| JP | 2005052904 | A | 3/2005 |
| JP | 2006123081 | A | 5/2006 |
| JP | 2006175562 | A | 7/2006 |
| JP | 2003220569 | A | 8/2006 |
| WO | WO-9521039 | A1 | 8/1995 |
| WO | WO-2007135107 | A1 | 11/2007 |

* cited by examiner

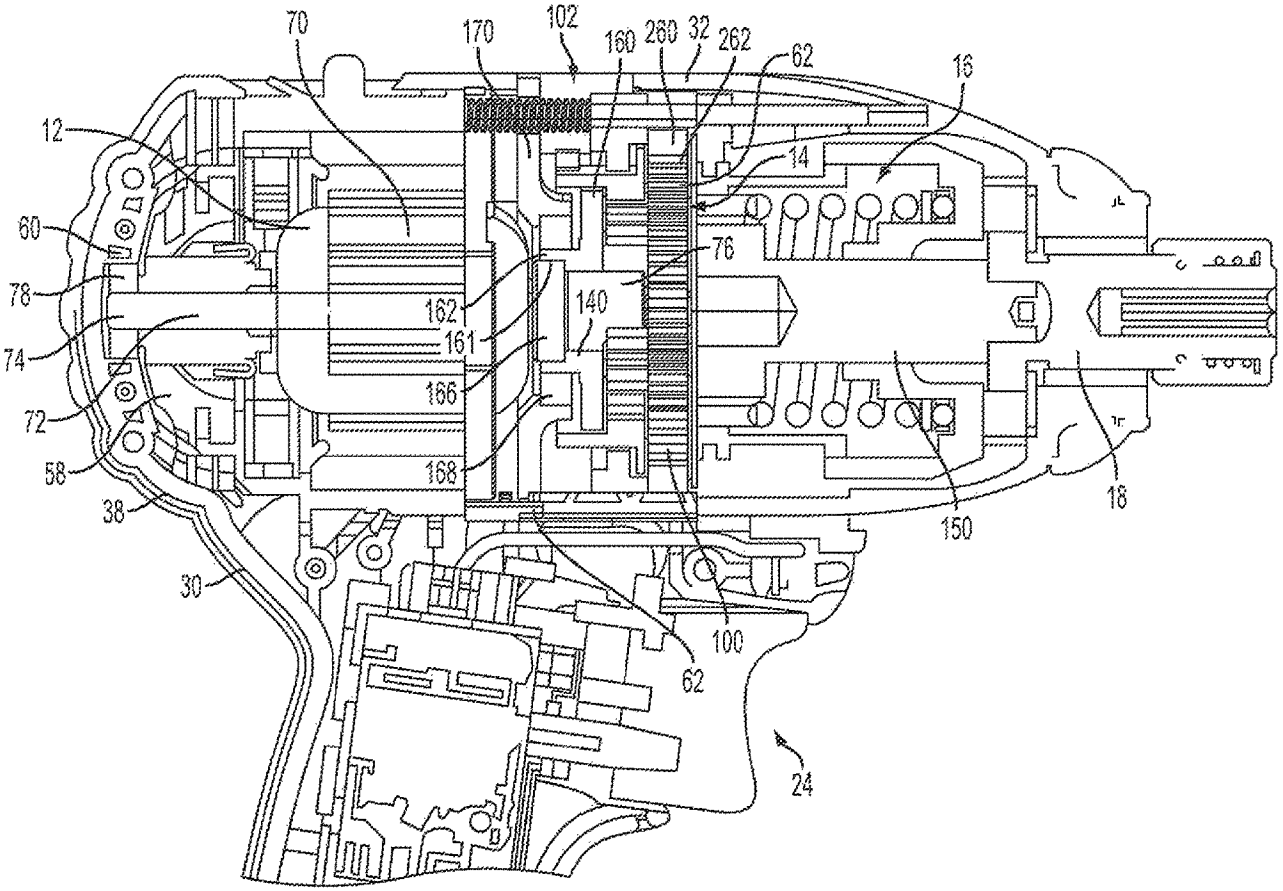
FIG. 4 (AMENDED)

HYBRID IMPACT TOOL WITH TWO-SPEED TRANSMISSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Provisional Patent Application No. 61/289,780 filed Dec. 23, 2009 and U.S. Provisional Patent Application No. 61/290,759 filed Dec. 29, 2009. The disclosures of each of these applications are incorporated by reference as if fully set forth in detail herein.

*Notice: This is a reissue application of U.S. Pat. No. 8,460,153.*

INTRODUCTION

The present invention generally relates to a hybrid impact tool with a two-speed transmission.

Rotary impact tools are known to be capable of producing relatively high output torque and as such, can be suited in some instances for driving screws and other threaded fasteners. One drawback associated with conventional rotary impact tools concerns their relatively slow fastening speed when a threaded fastener is subject to a prevailing torque (i.e., a not insubstantial amount of torque is required to drive the fastener into a workpiece before the head of the fastener is abutted against the workpiece). Examples of such applications include driving large screws, such as lag screws, into a wood workpiece. In such applications, it is not uncommon for a rotary impact tool to begin impacting shortly after the tip of the lag screw is driven into the workpiece. As lag screws can be relatively long, a significant amount of time can be expended in driving lag screws into workpieces.

Hybrid impact tools permit a user to operate the tool in a rotary impact mode or a drill mode that provides continuous rotation of an output spindle. The ability to change between a rotary impacting mode and a non-impacting mode is highly advantageous as the non-impacting mode is much better suited for most types of drilling, particularly when relatively small diameter drill bits are employed. While several of the known hybrid impact tools are generally suited for their intended purpose, it will be appreciated that hybrid impact tools are susceptible to improvement. Such improvements can be made for example, to the transmission that transmits rotary power from a motor to an input spindle of the impact mechanism.

SUMMARY

This section provides a general summary of some aspects of the present disclosure and is not a comprehensive listing or detailing of either the full scope of the disclosure or all of the features described therein.

In one form, the present teachings provide a power tool that includes a housing, a motor, a planetary transmission, a first bearing and a second bearing. The motor is disposed in the housing and includes an output shaft. The planetary transmission has a sun gear, a plurality of first planet gears, a first ring gear and a carrier. The sun gear is driven by the output shaft. The first planet gears are driven by the sun gear and have teeth that are meshingly engaged to teeth of the first ring gear. The carrier includes a rear carrier plate and a front carrier plate between which the first and second planet gears are received. The rear carrier plate includes a first bearing aperture. The first bearing is received in the first bearing aperture and is configured to support the output shaft. The second bearing is received onto the rear carrier plate to support the carrier relative to the housing.

In another form, the present teachings provide a power tool that includes a housing, a motor, an output member, a power transmitting mechanism, and a shift mechanism. The motor is coupled to the housing and has an output shaft. The power transmitting mechanism drivingly couples the output shaft to the output member and includes a transmission having dual planetary stage with a sun gear, a first planet gear, a second planet gear, a planet carrier, a first ring gear and a second ring gear. The first and second planet gears are rotatably mounted on the planet carrier. The first planet gear is disposed between the motor and the second planet gear and has a pitch diameter that is smaller that a pitch diameter of the second planet gear. The first ring gear is meshingly engaged with the first planet gear and the second ring gear is meshingly engaged with the second planet gear. The shift mechanism has a collar that is non-rotatably but axially slidably coupled to the housing for movement between a first position and a second position. The collar includes an annular collar body, a first set of external splines and a second set of external splines. The collar body is received about the first ring gear. The first set of external splines extend radially inwardly from the collar body and engage a third set of external splines formed about the first ring gear when the collar is in the first position to inhibit rotation of the first ring gear relative to the housing. The second set of external splines is coupled to an end of the collar body that faces opposite the motor. The second set of external splines engages a fourth set of external splines formed on the second ring gear when the collar is in the second position to inhibit rotation of the second ring gear relative to the housing.

In still another form, the present teachings provide a power tool that includes a housing, a motor, an output member, a power transmitting mechanism and a shift mechanism. The motor is coupled to the housing and has an output shaft. The power transmitting mechanism drivingly couples the output shaft to the output member and includes a transmission having dual planetary stage with a sun gear, a compound planet gear, a planet carrier, a first ring gear and a second ring gear. The compound planet gear is rotatably mounted on the planet carrier and has first and second planet gears that are fixedly coupled to one another. The first planet gear is disposed between the motor and the second planet gear and has a pitch diameter that is smaller that a pitch diameter of the second planet gear. The first ring gear is meshingly engaged with the first planet gear, and the second ring gear being meshingly engaged with the second planet gear. The first planet gear has a first quantity (Q1) of teeth, the second planet gear has second quantity of teeth (Q2) and the quotient of the quantity of teeth on the second planet gear divided by the quantity of teeth on the first planet (Q2/Q1) gear is not an integer. The shift mechanism has a collar that is non-rotatably but axially slidably coupled to the housing for movement between a first position and a second position. The collar non-rotatably couples the first ring gear to the housing in the first position and non-rotatably couples the second ring gear to the housing in the second position.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

FIG. 4 is a longitudinal cross-section view of the portion of the hybrid impact tool illustrated in FIG. 3;

DETAILED DESCRIPTION OF THE VARIOUS EMBODIMENTS

Figure 1:
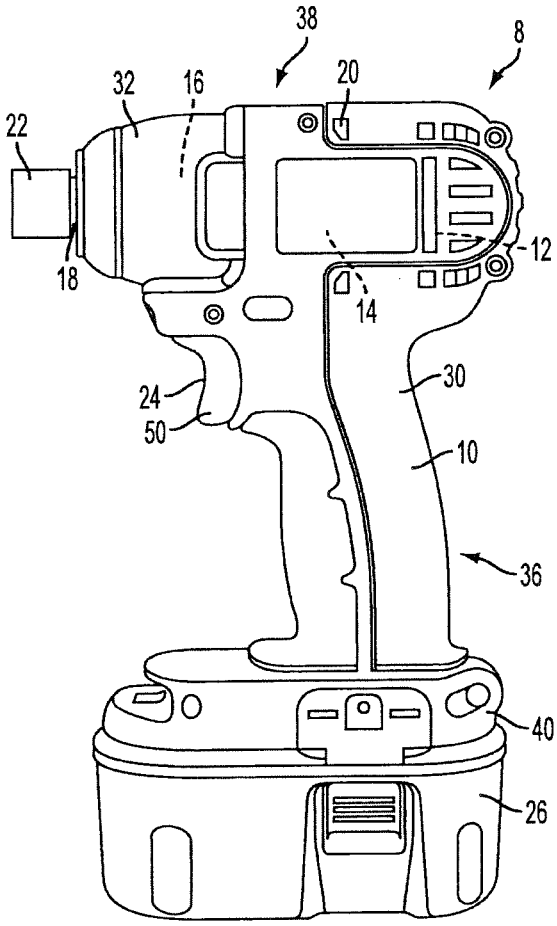
FIG. 1 is a perspective view of a hybrid impact tool constructed in accordance with the teachings of the present disclosure.
Figure 2:
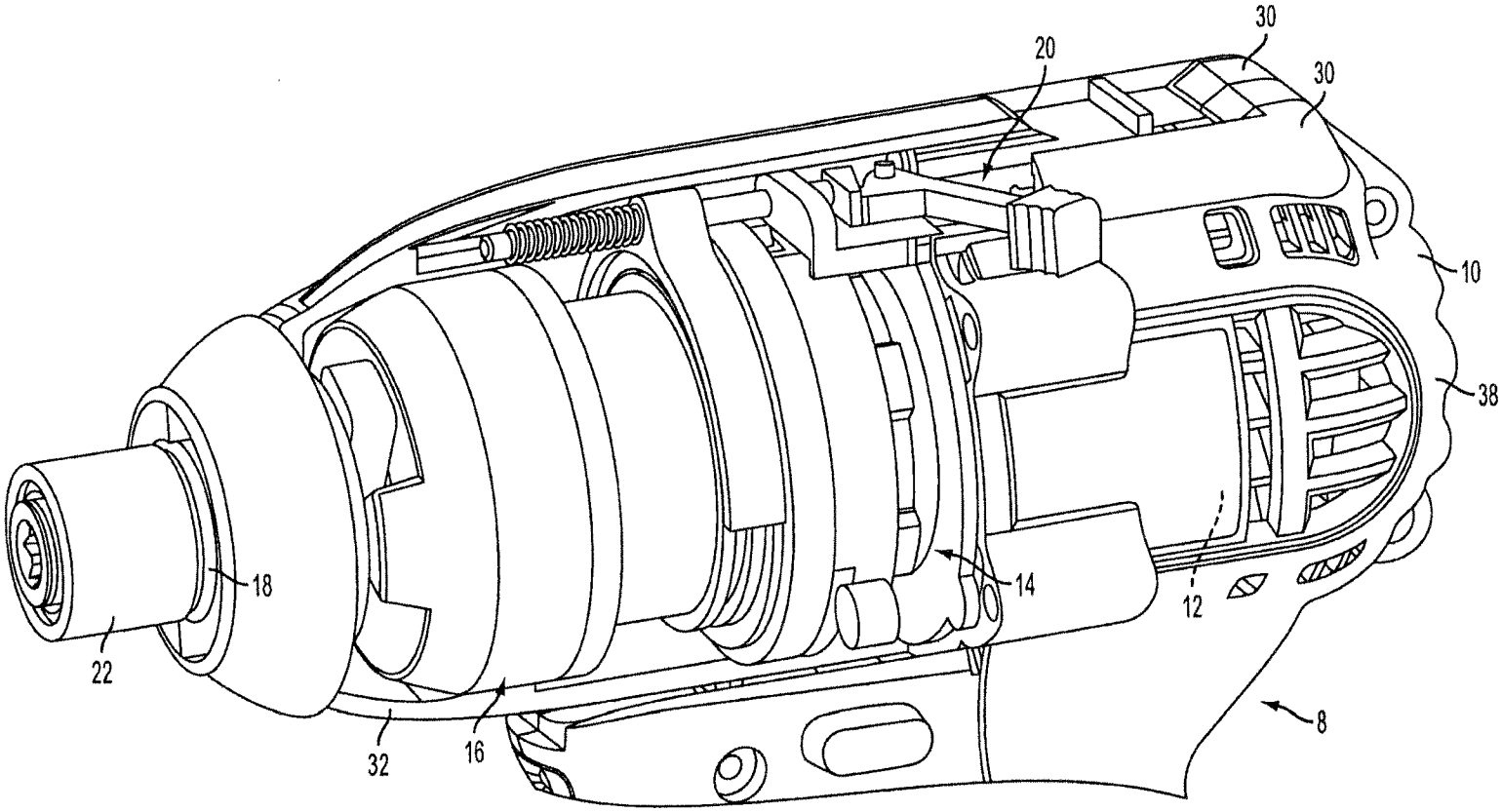
FIG. 2 is a perspective, partly broken away view of the hybrid impact tool of FIG. 1.
Figure 3:
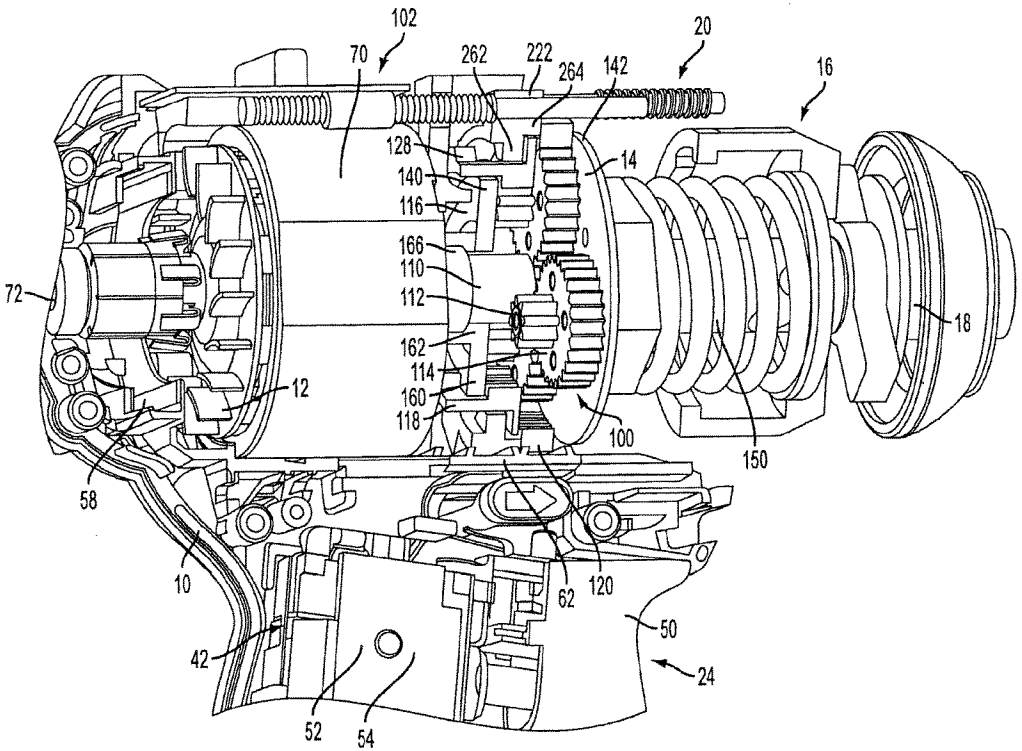
FIG. 3 is a perspective partly broken away view of the hybrid impact tool of FIG. 1 illustrating the motor assembly and the transmission assembly in more detail.

With reference to FIGS. 1 through 3, a hybrid impact tool constructed in accordance with the teachings of the present disclosure is generally indicated by reference numeral 8. Those of ordinary skill in the art will appreciate that the hybrid impact tool 8 may be either a corded or cordless (i.e., battery powered) device and that the teachings of the present disclosure may have applicability to other types of power tools, including without limitation screwdrivers, drill/drivers, hammer-drill/drivers, rotary hammers and impact drivers. The hybrid impact tool can include a housing 10, a motor assembly 12, a multi-speed transmission assembly 14, an impact mechanism 16, an output spindle 18, a mode change mechanism 20, a chuck 22, a trigger assembly 24 and a battery pack 26. The chuck 22, the trigger assembly 24 and the battery pack 26 can be conventional in their construction and operation and as such, will not be discussed in significant detail herein. The impact mechanism 16, output spindle 18 and mode change mechanism 20 can be constructed as described in co-pending U.S. Provisional Patent Application No. 61/100,091 entitled "Hybrid Impact Tool", the entire disclosure of which is hereby incorporated by reference as if set forth herein in its entirety.

The housing 10 can include a pair of mating housing shells 30 and a gear case 32 that can be removably coupled to the housing shells 30. The housing shells 30 can cooperate to define a handle portion 36 and a body portion 38. The handle portion 36 can include a battery pack mount 40, to which the battery pack 26 may be removably mounted, and a switch mount 42 (FIG. 3). The trigger assembly 24 can include a trigger 50 for operating the hybrid impact tool 8 and a trigger controller 52 (FIG. 3), which can include a switch 54 (FIG. 3) that can be employed to electrically couple the motor assembly 12 to a power source, such as the battery pack 26, to operate the hybrid impact tool 8.

With reference to FIGS. 3 and 4, the body portion 38 can define a motor cavity 58, which can be configured to receive the motor assembly 12, a rear bearing mount 60 and a front bearing mount 62. The gear case 32 can be a container-shaped structure that can be fixedly but removably coupled to the housing shells 30 to house the multi-speed transmission assembly 14, the impact mechanism 16, the output spindle 18 and the mode change mechanism 20.

The motor assembly 12 can include a motor 70 that can include an output shaft 72 having a rear end 74 and a forward end 76. The rear end 74 can be supported for rotation relative to the housing by a bearing 78 that can be received in the rear mount 60. The motor 70 can be electrically coupled to the trigger assembly 24 and the battery pack 26 (FIG. 1) in a conventional manner. It will be appreciated that while the present disclosure describes the motor assembly 12 as including an electrically-powered motor, those of skill in the art will appreciate that the motor 70 can be any type of motor (e.g., pneumatic, hydraulic, AC electric) for providing rotary power to the multi-speed transmission assembly 14.

Figure 6:
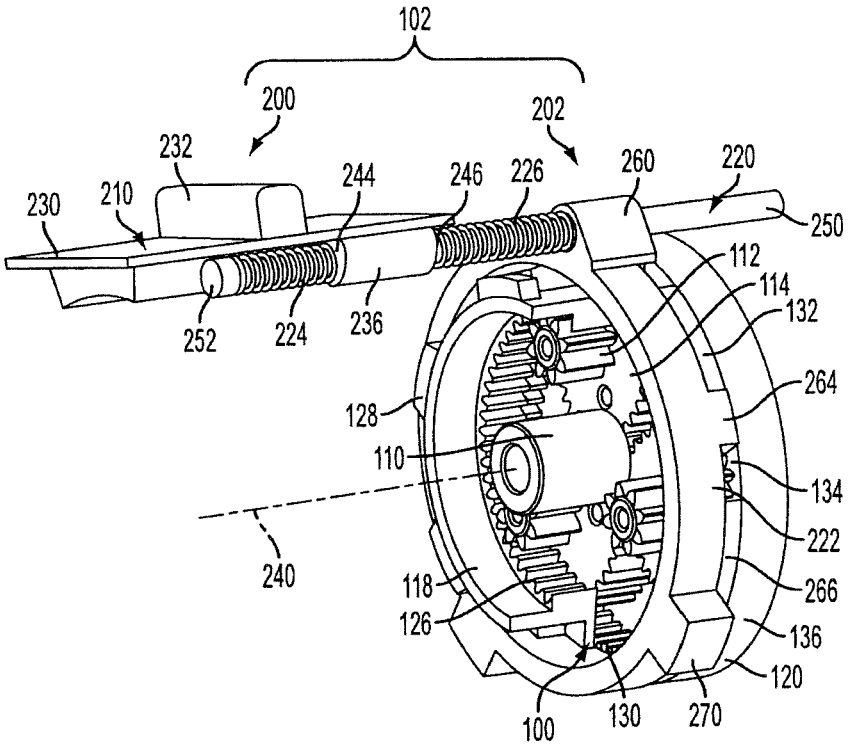
FIG. 6 is a perspective view of the transmission assembly.

With reference to FIGS. 3, 4 and 6, the multi-speed transmission assembly 14 can include a reduction gearset 100 and a speed selector 102. The reduction gearset 100 can be a single stage, two-speed gearset but those of skill in the art will appreciate that the reduction gearset 100 could be constructed with more stages depending on a desired gear reduction ratio.

Figure 5:
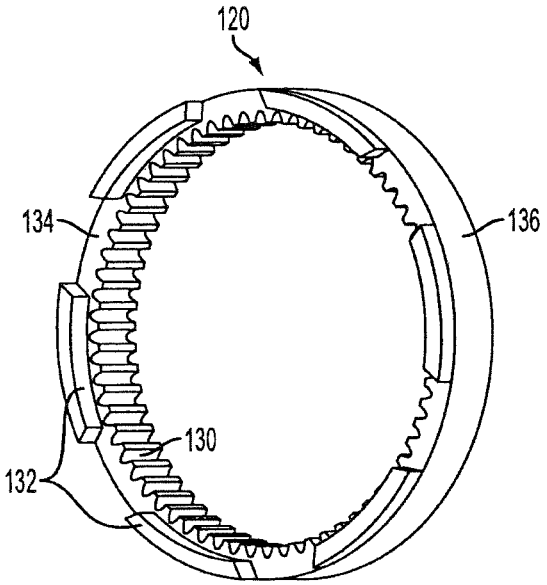
FIG. 5 is a perspective view of a portion of the transmission assembly illustrating the second ring gear in more detail.

The reduction gearset 100 can include an input sun gear 110, a first set of input planet gears 112, a second set of input planet gears 114, an input carrier 116, a first input ring gear 118 and a second input ring gear 120. The input sun gear 110 can be coupled for rotation with the output shaft 72 of the motor 70. The first set of input planet gears 112 can comprise a plurality of first planet gears having a first quantity of teeth that can be arranged about a first pitch diameter, while the second set of input planet gears 114 can comprise a plurality of second planet gears having a second quantity of teeth that can be arranged about a second pitch diameter. The first input ring gear 118 can be an annular structure having a plurality of internal teeth 126 disposed proximate a forward axial face and a plurality of external splines or teeth 128 that can extend radially outwardly from a portion of the first input ring gear 118 proximate a rear axial face. The plurality of internal teeth 126 can be meshingly engaged with the teeth of the first planet gears of the first set of planet gears 112. The second input ring gear 120 can include a plurality of internal teeth 130, which can be meshingly engaged with the teeth of the second planet gears of the second set of planet gears 114, and a plurality of external splines or teeth 132 (FIG. 5) that can extend rearwardly from a rear axial face 134 (FIG. 5) of a body 136 (FIG. 5) of the second input ring gear 120. The input carrier 116 can include a rear carrier plate 140, a front carrier plate 142 and a plurality of pins (not specifically shown) that can be fixedly coupled to the rear and front carrier plates 140 and 142. The planet gears of the first and second sets of input planet gears 112 and 114 can be rotatably mounted on respective pins. An input spindle 150 of the impact mechanism 16 can be coupled for rotation with the front carrier plate 142.

With specific reference to FIG. 4, the rear carrier plate 140 can be an annular structure that can be received over the output shaft 72 of the motor 70. The rear carrier plate 140 can include a first portion 160 and a second portion 162. The first portion 160 can be abutted against a rear surface of the planet gears of the first set of planet gears 112 to inhibit undesired axial movement of the first and second sets of planet gears 112 and 114. The second portion 162 can be relatively smaller in diameter than the first portion 160 and can be configured to *have a first bearing aperture 161 to* receive therein a front motor bearing (*or first bearing*) 166 that can support the output shaft 72. An impact mechanism support bearing (*or second bearing*) 168 can be received over the second portion 162 of the rear carrier plate 140 and can be engaged to a bearing support plate 170 that is received in the housing 10 and disposed between the motor 70 and the reduction gearset 100. Configuration in this manner nests the front motor bearing 166 and the impact mechanism support bearing 168 to reduce the overall length of the tool, as well as aids in the alignment of the motor 70 and the impact mechanism 16 (FIG. 3) as the front motor bearing 166 and the impact mechanism support bearing 168 are mounted on the same machined piece (i.e., the rear carrier plate 140).

In the particular example provided, the planet gears of the first set of planet gears 112 are axially offset from the motor 70 by a distance that is smaller than the amount by which the planet gears of the second set of planet gears 114 are axially offset from the motor 70 (i.e., the planet gears of the first set of planet gears 112 are closer to the motor 70 than the planet gears of the second set of planet gears 114); the second quantity of teeth is greater than the first quantity of teeth; the second pitch diameter is larger than the first pitch diameter; each of the planet gears of the first set of planet gears 112 is coupled for rotation with a corresponding one of the planet gears of the second set of planet gears 114 (e.g., the planet gears of the first and second sets of planet gears 112 and 114 can be integrally formed); and only the planet gears of the second set of input planet gears 114 are meshingly engaged with the input sun gear 110 (FIG. 3). It will be appreciated that rotation of the input sun gear 110 (FIG. 3) can cause corresponding rotation of the planet gears of the second set of input planet gears 114 and that as the planet gears of the first set of input planet gears 112 are coupled for rotation with the planet gears of the second set of input planet gears 114, the planet gears of the first set of input planet gears 112 may be driven (e.g., by the input sun gear 110) without directly engaging an associated sun gear (not shown).

In FIG. 6, the speed selector 102 can include a switch assembly 200 and an actuator assembly 202. The switch assembly 200 can include a switch 210 and a pair of first detent members (not specifically shown), while the actuator assembly 202 can include a rail 220, a collar 222, a first biasing spring 224 and a second biasing spring 226.

The switch 210 can include a plate structure 230, a switch member 232, a pair of second detent members (not specifically shown) and a bushing 236. The plate structure 230 can be received in a pair of slots (not specifically shown) formed into the housing shells 30 (FIG. 1) generally parallel to the longitudinal axis 240 of the reduction gearset 100. The switch member 232 can be configured to receive a manual input from an operator of the hybrid impact tool 8 (FIG. 1) to move the switch 210 between a first switch position and a second switch position. Indicia (not specifically shown) may be marked or formed on one or both of the housing shells 30 (FIG. 1) or the plate structure 230 to indicate a position into which the switch 210 is located. The second detent members can cooperate with the first detent members to resist movement of the switch 210. In the example provided, the second detent members comprise a plurality of detent recesses that are formed in the plate structure 230. The bushing 236 can be coupled to a lateral side of the plate structure 230 and can include a bushing aperture (not specifically shown) and first and second end faces 244 and 246, respectively.

Each of the housing shells 30 (FIG. 1) can define a pair of detent mounts (not specifically shown) that can be configured to hold the first detent members. The first detent members can be leaf springs that can be configured to engage the detent recesses that are formed in the plate structure 230 to resist movement of the switch 210 relative to the housing shells 30 (FIG. 1).

The rail 220 can include a generally cylindrical rail body 250 and a head portion 252 that can be relatively large in diameter than the rail body 250. The rail 220 can be received through the bushing aperture in the bushing 236 such that the bushing 236 is slidably mounted on the rail body 250.

With additional reference to FIG. 3, the collar 222 can be an annular structure that can include a mount 260, a plurality of internal splines or teeth 262 formed about the inside surface of the collar 222, and a plurality of teeth 264 formed into the front axial face of the collar 222. An end of the rail body 250 opposite the head portion 252 can be received into the mount 260 to fixedly couple the rail 220 to the collar 222. In the particular example provided, the rail body 220 is press-fit into the mount 260, but it will be appreciated that other coupling techniques, including bonding, adhesives, pins and threaded fasteners, could be employed to couple the rail 220 to the collar 222. The internal splines or teeth 262 formed about the inside surface of the collar 222 can be sized to engage the external splines or teeth 128 formed on the first input ring gear 118, while the plurality of or teeth 264 formed into the front axial face of the collar 222 can be sized to engage the external splines or teeth 132 that extend rearwardly from the rear axial face 134 of the body 136 of the second input ring gear 120. Lugs 270 formed on the collar 222 can be slidably received in axially extending grooves (not specifically shown) formed in the gear case 32 (FIG. 1) to aid in guiding the collar 222.

The first biasing spring 224 can be mounted on the rail body 250 between the head portion 252 and the first end face 244 of the bushing 236. The second biasing spring 226 can be mounted on the rail body 250 between the second end face 246 of the bushing 236 and the collar 222.

Figure 7:
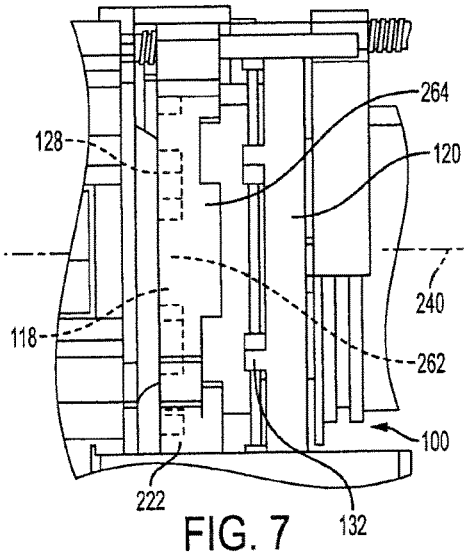
FIGS. 7, 8 and 9 are side elevation views of the transmission assembly with the reduction gearset being configured in high, low and neutral speed settings, respectively.
Figure 9:
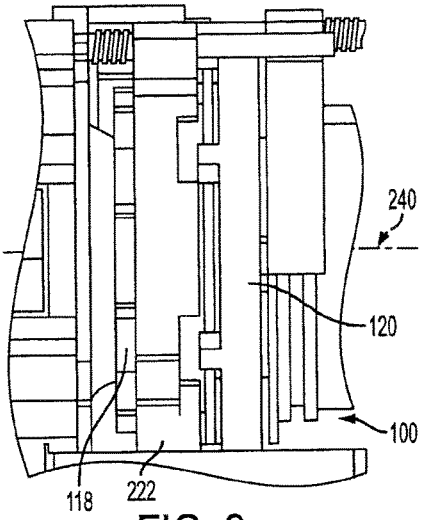
Figure 8:
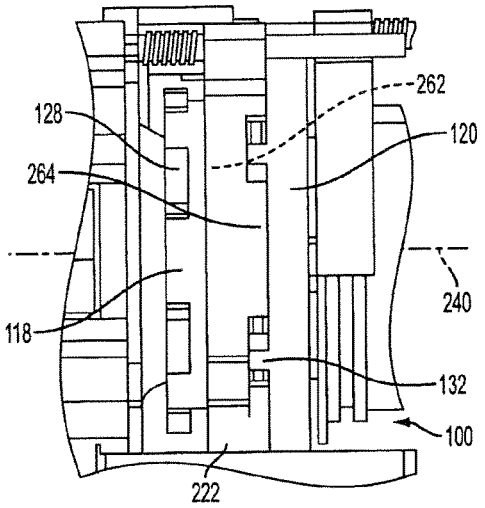

With reference to FIGS. 7-9, the collar 222, the first input ring gear 118 and the second input ring gear 120 are shown relative to the longitudinal axis 240 of the reduction gearset 100. It will be appreciated that the collar 222 can be moved axially along the longitudinal axis 240 between a first position (FIG. 7) and a second position (FIG. 8).

In the first position, which is illustrated in FIG. 7, the internal splines or teeth 262 (best shown in FIG. 3) formed about the inside surface of the collar 222 can be meshingly engaged with the external splines or teeth 128 (best shown in FIG. 3) of the first input ring gear 118 while the internal splines or teeth 264 formed on the collar 222 are disengaged from the external splines or teeth 132 formed on the second input ring gear 120. Positioning of the collar 222 in this manner permits the reduction gearset 100 to operate at a first gear ratio. More specifically and with additional reference to FIG. 3, rotary power received from the motor 70 is transmitted through the input sun gear 110 to cause the planet gears of the second set of input planet gears 114 to rotate about the pins of the input carrier 116. As the planet gears of the first set of input planet gears 112 are coupled for rotation with the planet gears of the second set of input planet gears 114, the planet gears of the first set of input planet gears 112 will rotate about the pins of the input carrier 116. Since the first input ring gear 118 is non-rotatably coupled to the gear case 32 (FIG. 4) via the collar 222, rotation of the planet gears of the first set of input planet gears 112 causes rotation of the input carrier 116 at a speed that is determined in part based on the first gear ratio. It will be appreciated that as the collar 222 is not engaged to the second input ring gear 120, rotation of the planet gears of the second set of input planet gears 114 will cause rotation of the second input ring gear 120.

In the second position, which is illustrated in FIG. 8, the internal splines or teeth 262 (best shown in FIG. 3) formed about the inside surface of the collar 222 can be disengaged from the external splines or teeth 128 (best shown in FIG. 3) of the first input ring gear 118 while the internal splines or teeth 264 formed on the collar 222 can be engaged to the external splines or teeth 132 (best shown in FIG. 5.) formed on the second input ring gear 120. Positioning of the collar 222 in this manner permits the reduction gearset 100 to operate at a second gear ratio. More specifically and with additional reference to FIG. 3, rotary power received from the motor 70 is transmitted through the input sun gear 110 to cause the planet gears of the second set of input planet gears 114 to rotate about the pins of the input carrier 116. Since the second input ring gear 120 is non-rotatably coupled to the gear case 32 (FIG. 4) via the collar 222, rotation of the planet gears of the second set of input planet gears 114 causes rotation of the input carrier 116 at a speed that is determined in part based on the second gear ratio. It will be appreciated that as the collar 222 is not engaged to the first input ring gear 118, rotation of the planet gears of the second set of input planet gears 114 will cause rotation of the first input ring gear 118 (via corresponding rotation of the planet gears of the first set of input planet gears 112).

Configuration of the reduction gearset 100 and collar 222 in the manner provides several advantages. For example, the above-described configuration permits the collar 222 to be shifted into a neutral position when being moved between the first and second positions (i.e., the collar 222 will fully disengage the first input ring gear 118 before initiating engagement with the second input ring gear 120 and vice versa) as is shown in FIG. 9. With reference to FIGS. 3, 4 and 6, the combination of the axial spacing apart of the internal splines or teeth 126 and the external splines or teeth 128 of the first input ring gear 118 provides additional room for shifting the collar 222 while efficiently packaging the front motor bearing 166 and the impact mechanism support bearing 168 in a way that provides the desired neutral position in addition to a reduction in the overall length of the hybrid impact tool 8 (FIG. 1). Stated another way, the "additional" length needed to provide a neutral position is obtained by positioning the external splines or teeth 128 of the first input ring gear 118 further rearwardly than they otherwise would have been, so that the external splines or teeth 128 are located in a position or axial zone that is employed to house the bearings 166 and 168 that support the motor 70 and the impact mechanism 16 permits the overall length of the hybrid impact tool 8 (FIG. 1) to be reduced.

As another example, the above-described configuration utilizes splines or teeth on the rear and front faces of the second input ring gear 120 and the collar 222, respectively, to reduce the overall diameter of the reduction gearset 100 as compared with an arrangement that places the mating splines or teeth on the second input ring gear 120 and the collar 222 in a radial orientation (as with the first input ring gear 118 and the collar 222). It will be apparent to those of skill in the art that as the planet gears of the first set of planet gears 112 are disposed about a smaller pitch diameter in the example provided, the first input ring gear 118 can be relatively smaller in diameter than the second input ring gear 120 and consequently, the use of mating splines or teeth disposed in a radial direction do not have a similar impact on the overall diameter of the reduction gearset 100.

It will be appreciated that the first and second biasing springs 224 and 226 are configured to resiliently couple the collar 222 to the switch 210 in a manner that provides for a modicum of compliance. In instances where the switch 210 is to be moved from the first switch position to the second switch position but the internal splines or teeth 264 formed on the collar 222 are not aligned to the external splines or teeth 132 formed on the second input ring gear 120, the switch 210 can be translated into the second switch position without fully moving the collar 222 by an accompanying amount. In such situations, the second biasing spring 226 is compressed between the second end face 246 of the bushing 236 and the mount 260 of the collar 222. Rotation of the second input ring gear 120 relative to the collar 222 can permit the external splines or teeth 132 formed on the second input ring gear 120 to align to the internal splines or teeth 264 formed on the collar 222 and once aligned, the second biasing spring 226 can urge the collar 222 forwardly into engagement with the second input ring gear 120.

In instances where the switch 210 is to be moved from the second switch position to the first switch position but the internal splines or teeth 262 formed about the inside surface of the collar 222 are not aligned to the external splines or teeth 128 of the first input ring gear 118, the switch 210 can be translated into the first switch position without fully moving the collar 222 by an accompanying amount. In such situations, the first biasing spring 224 is compressed between the head portion 252 of the rail 220 and the first end face 244 of the bushing 236. Rotation of the first input ring gear 118 relative to the collar 222 can permit the external splines or teeth 128 to align to the internal splines or teeth 262 formed about the collar 222 and once aligned, the first biasing spring 224 can urge the collar 222 rearwardly into engagement with the first input ring gear 118.

Figure 10:
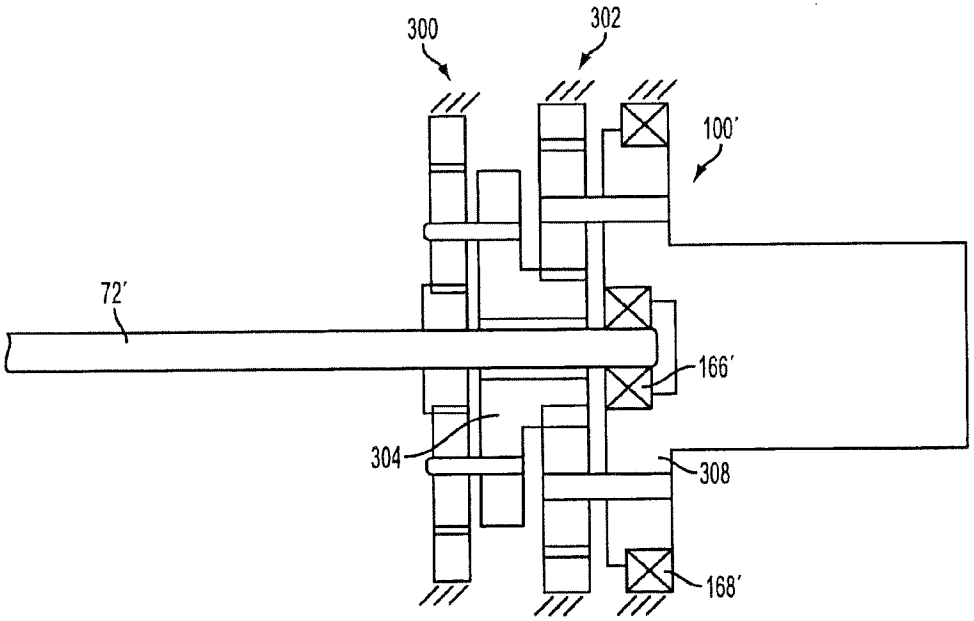
FIG. 10 is a schematic illustration of an alternatively constructed reduction gearset.
Figure 12:
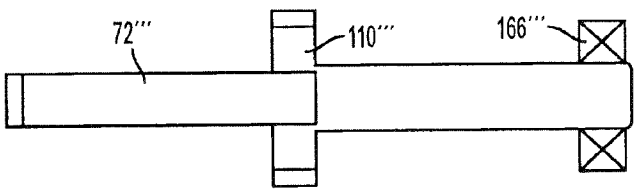
FIGS. 11 and 12 are schematic illustrations that illustrate alternative configurations that may be employed in the reduction gearset of FIG. 10.
Figure 11:
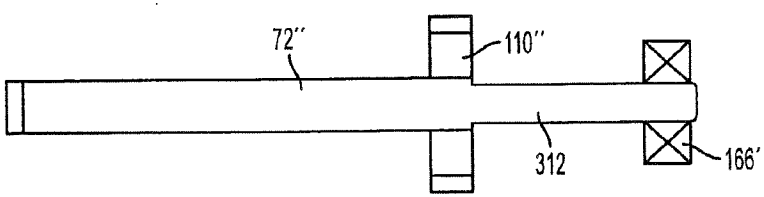

It will be appreciated that the motor bearing 166 may be positioned somewhat differently from that which is described above as is shown in FIGS. 10, 11 and 12. In the example of FIG. 10 the reduction gearset 100' includes a fixed input stage 300 and a fixed output stage 302 (i.e., the input and output stages 300 and 302 always provide corresponding gear reductions). The motor output shaft 72' is received through an input carrier 304 associated with the input stage 300 and the motor bearing 166' is received in an output carrier/spindle 308 associated with the output stage 302. The impact mechanism bearing 168' is mounted on the output carrier 308. The example of FIG. 11 partly illustrates a similar motor output shaft 72''' except that the portion 312 of the motor output shaft 72" between the input sun gear 110" and the motor bearing 166" is necked down in diameter. The example of FIG. 12 is similar to the previous example except that the motor output shaft 72''' is received into an end of the input sun gear 110''' and the motor bearing 166''' is received onto an opposite end of the input sun gear 110'''.

Figure 14:
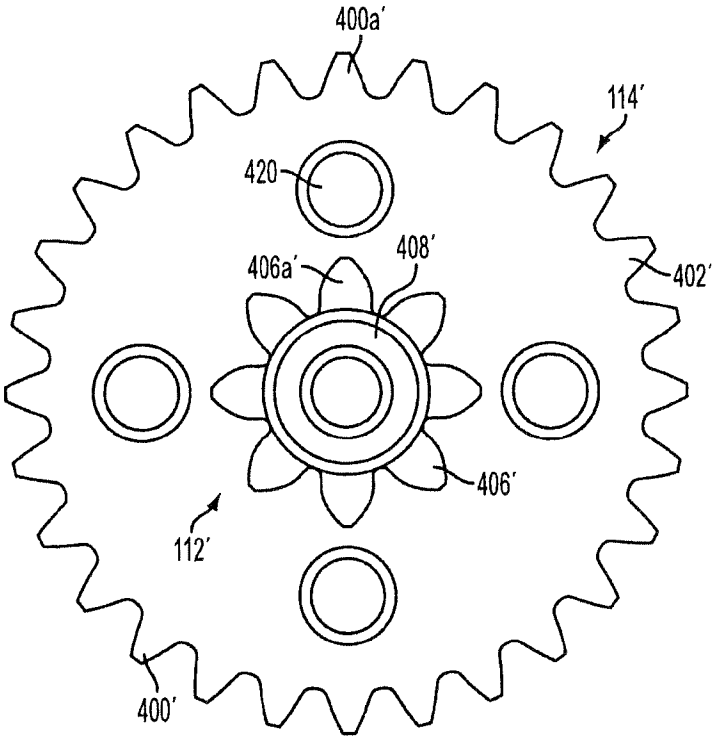
FIG. 14 is a view similar to that of FIG. 13 but illustrating an alternatively configured planet gears.
Figure 13:
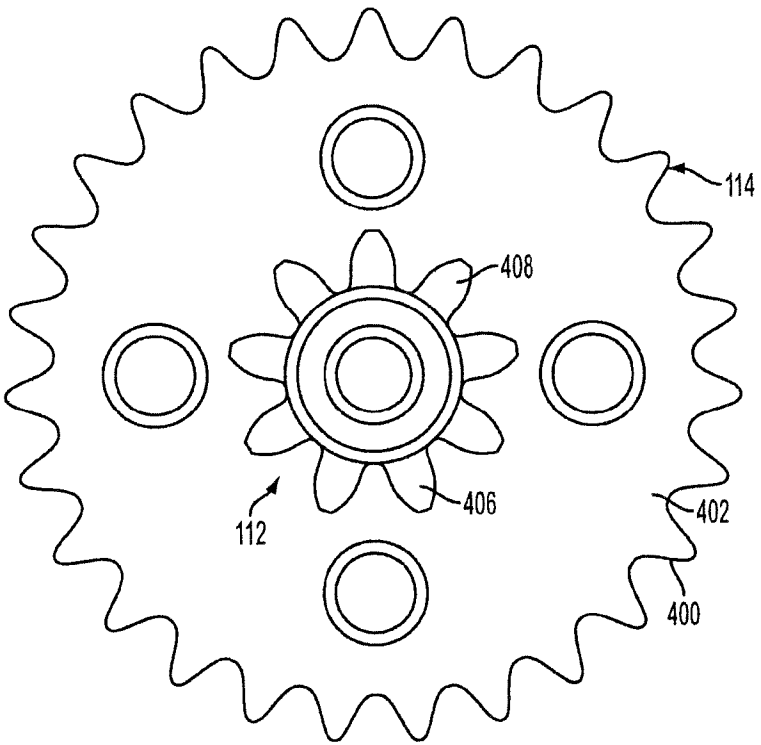
FIG. 13 is a rear elevation view of the planet gears of the reduction gearset of FIG. 3.

With reference to FIGS. 3 and 13, the reduction gearset 100 can be configured such that the quotient of the quantity of teeth 400 on the planet gears 402 of the second set of input planet gears 114 divided by the quantity of teeth 406 on the planet gears 408 of the first set of input planet gears 112 is an integer. As is well understood by those of ordinary skill in the art, configuration of the first and second sets of planet gears 112 and 114 in this manner eliminates the need to time the planet gears 402, 408 relative to another gear in the reduction gearset 100. It will also be appreciated by those of skill in the art that maintaining such a relationship between the teeth 400, 406 of the planet gears 402, 408 can limit reduce the number of gear ratios that may be employed in the design of the reduction gearset 100 and that by changing the number of teeth 406 on the planet gear 408 relative to the number of the teeth 400 on the planet gear 402, a wider selection of gear ratios is available to the designer while keeping the planet gear 408 coupled for rotation with the planet gear 402. In situations where the quotient of the quantity of teeth 400' on the planet gears 402' of the second set of input planet gears 114' divided by the quantity of teeth 406' on the planet gears 408' of the first set of input planet gears 112' is not an integer, as in the example of FIG. 14, it may be necessary to time the planet gears 402', 408' to be sure that they will properly mesh with the associated gears of the gearset. To aid in the timing of the gears, a timing aperture 420 is formed in the planet gear 402' at a desired location. In the particular example provided, the desired location is in-line with teeth 400a' and 406a' so that a line extending from the center of the gear 402' can bisect the teeth 402a', 406a' and the timing aperture 420.

Figure 15:
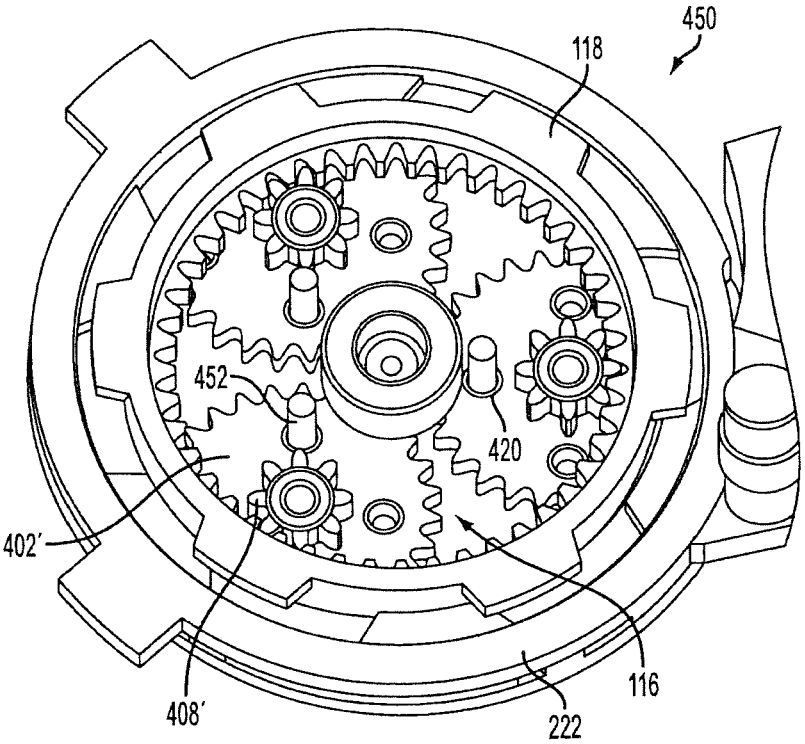
FIG. 15 is a perspective partly broken away view illustrating the assembly of the alternatively configured planet gears of FIG. 14 into the reduction gearset.
Figure 16:
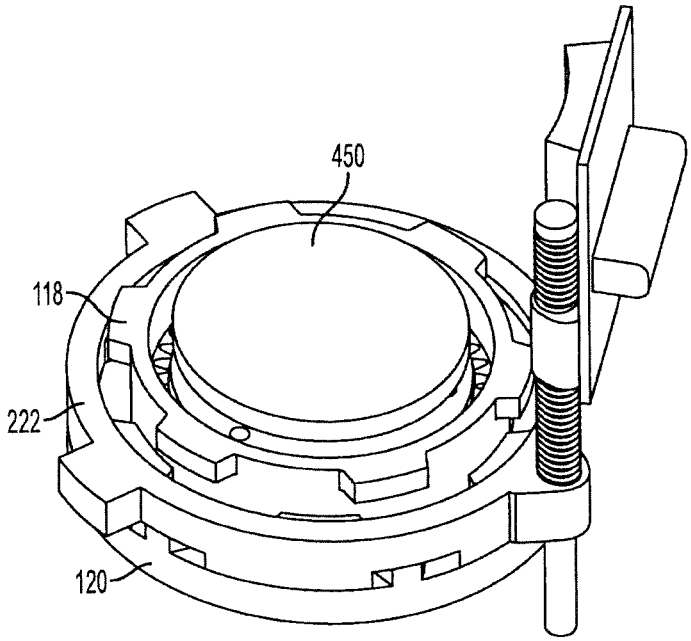
FIG. 16 is a perspective view illustrating the assembly of the alternatively configured planet gears of FIG. 14 into the reduction gearset.

With reference to FIGS. 15 and 16, a fixture 450 is configured with a plurality of pins 452 for aligning the gears 402', 408' relative to the remainder of the gearset. The gears 402' and 408' are initially assembled to the planet carrier 116 (FIG. 3) and the pins 452 of the fixture 450 are inserted into the timing apertures 420 in the gears 402'. The first input ring gear 118 is meshed with the gears 408' and the fixture 450 can be removed. The second input ring gear 120 can be meshed with the planet gears 402'.

Figure 20:
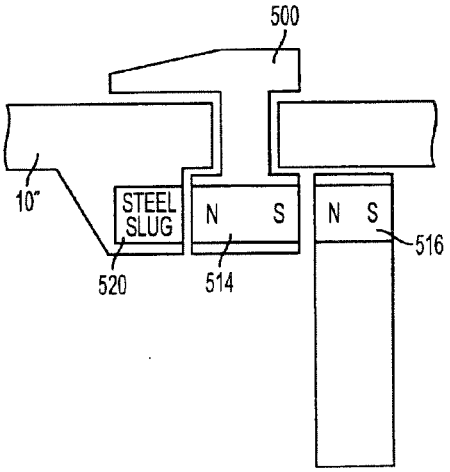

While the speed selector 102 (FIG. 6) has been illustrated and described as including an actuator assembly 202 (FIG. 6) with a rail 220 (FIG. 6), a first biasing spring 224 (FIG. 6) and a second biasing spring 226 (FIG. 6), it will be appreciated that the speed selector may be configured somewhat differently. For example, the speed selector 102' of FIGS. 17 and 18 includes a switch assembly 200' and an actuator assembly 202'. The switch assembly 200' can include a rotary knob 500 that can extend through the housing 10', whereas the actuator assembly 202' can include a first portion 510, which can be coupled for rotation with the rotary knob 500, and a second portion 512 that can be fixedly coupled to the collar 222'. The first portion 510 can include a first magnet 514 having a north pole N and a south pole 5, while the second portion 512 can include a second magnet 516 having a north pole N and a south pole S. It will be appreciated that the collar 222' is non-rotatably but axially slidably coupled to another structure, such as a pair of rods (not shown) that can be fixedly coupled to the housing 10'. Rotation of the rotary knob 500 into a first rotary position (FIG. 17) can orient a pole of the first magnet 514 to an opposite pole on the second magnet 516 (e.g., south pole S to north pole N, respectively) so as to cause the second magnet 516 (and the collar 222' with it) to be drawn toward the first portion to thereby shift the collar 222' into the first position. Similarly, rotation of the rotary knob 500 into a second rotary position (FIG. 18) can orient like poles of the first and second magnets 514 and 516 (e.g., north poles N and N) toward one another so as to cause the second magnet 516 (and the collar 222' with it) to be urged away from the first portion to thereby shift the collar 222' into the second position. As shown in FIG. 20, a slug 520 formed of a magnetically susceptible material, such as steel, can be coupled to the housing 10" to aid in maintaining the rotary knob 500 in the first and second rotary positions due to magnetic attraction between the slug 520 and the first magnet 514. So in comparison to the speed selector 102, and similar selectors known in the art, this design provides, an actuating force, shift compliance and dententing without the use of springs, cams or slots.

Figure 19:
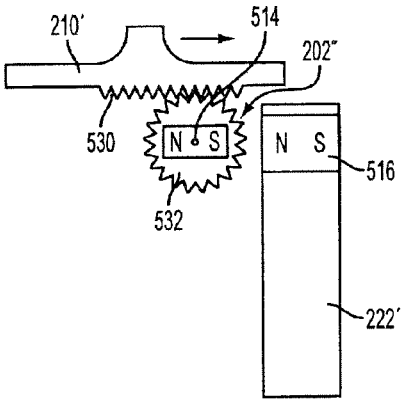

The example of FIG. 19 employs a slidable switch 210' having a rack 530 formed thereon, and an actuator assembly 202" having a pinion 532 that meshingly engages the rack 530 and into which the first magnet 514 is disposed. Sliding of the slidable switch 210' can orient the north and south poles N and S of the first magnet 514 to attract or repel the second magnet 516 as desired.

Figure 17:
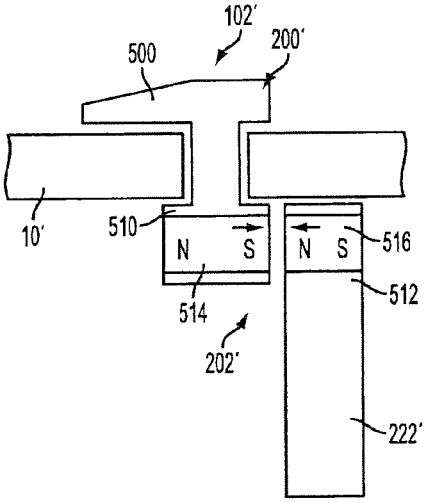
FIGS. 17-22 are schematic illustrations that depict alternatively configured switch mechanisms for translating an axially movable member, such as the collar of the transmission assembly.
Figure 18:
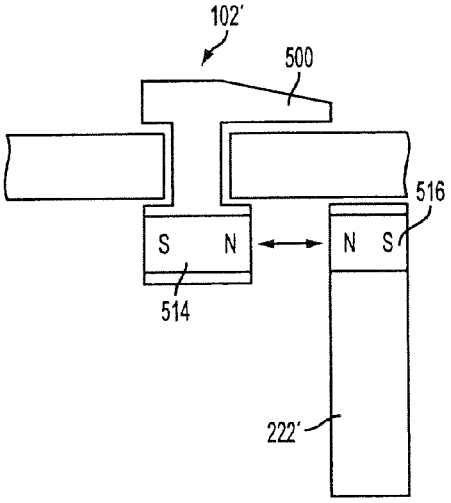
Figure 21:
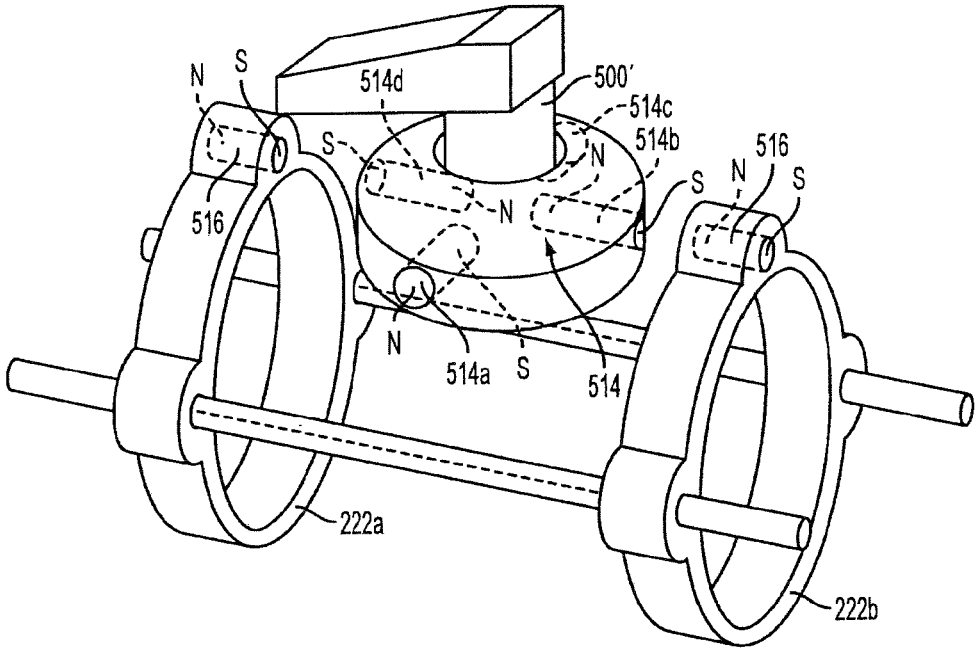
Figure 22:
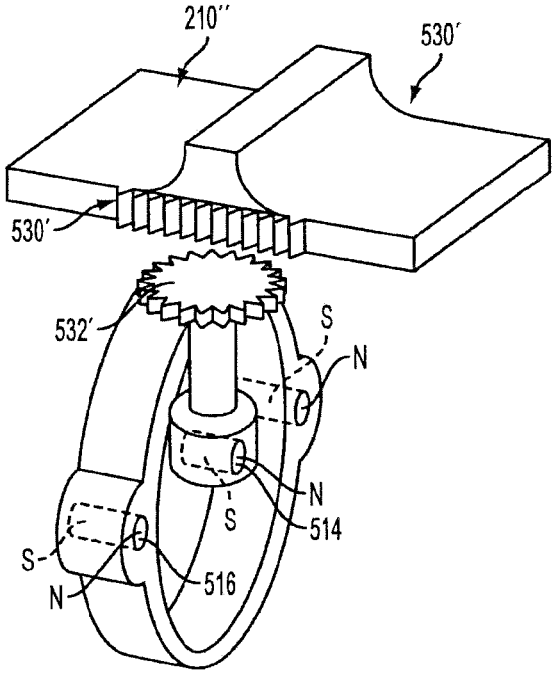

The example of FIG. 21 is similar to that of FIGS. 17 and 18, except that the rotary knob 500' is disposed between two axially movable collars 222a and 222b into each of which is disposed one of the second magnets 516. In this example, multiple magnets 514a, 514b, 514c, 514d are employed, but it will be appreciated that the quantity and orientation of the first magnets 514 and the orientation of the second magnets 516 can be configured to provide a desired movement scheme. The example of FIG. 22 is similar to the example of FIG. 19 except that a pair of racks 530' are formed on the sides of the slidable switch 210", a pair of pinions 532' are engaged to the racks 530' and the first magnets 514 are disposed vertically below the pinions 532'.

Figure 23:
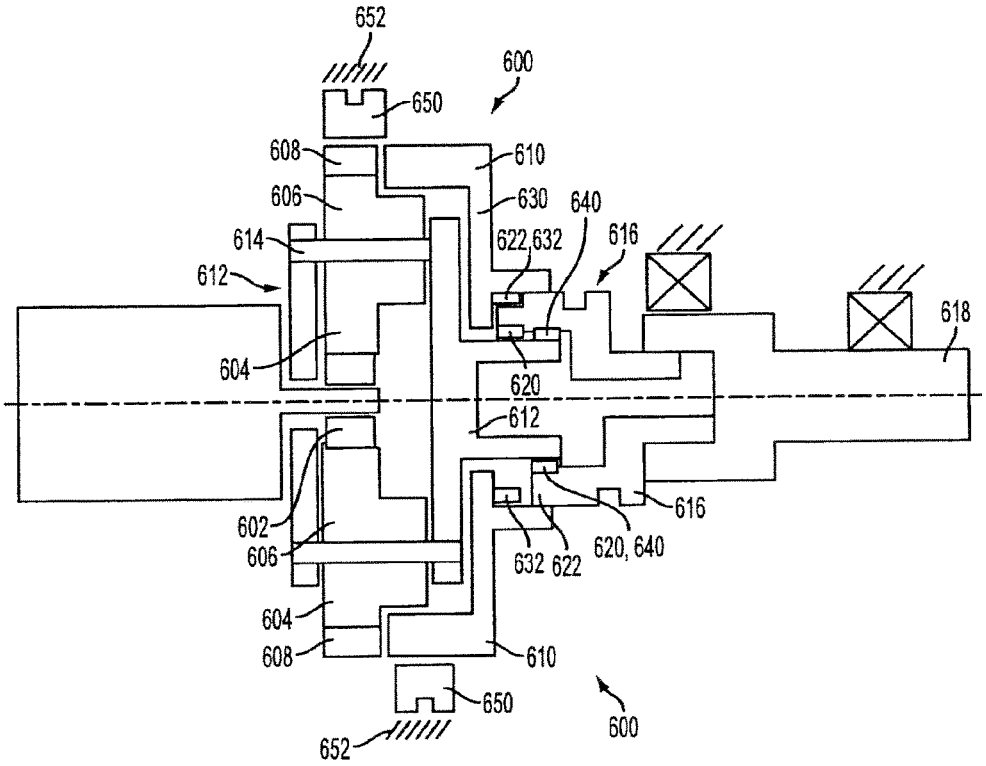
FIG. 23 is a schematic illustration of another transmission assembly constructed in accordance with the teachings of the present disclosure.

With reference to FIG. 23, a two-speed compound planetary transmission 600 is illustrated. The transmission 600 include a sun gear 602, a plurality of first planet gears 604, which are meshingly engaged to the sun gear 602, a plurality of second planet gears 606, which are fixed for rotation with corresponding ones of the first planet gears 604, a first ring gear 608, which is meshingly engaged with the first planet gears 604, a second ring gear 610, which is meshingly engaged with the second planet gears 606, a planet carrier 612, which has pins 614 onto which the first and second planet gears 604 and 606 are rotatably received, a shifting collar 616 and an output spindle 618. The shifting collar 616 has a plurality of internal teeth 620 and a plurality of external teeth 622. The second ring gear 610 can include a radially inwardly extending wall 630 and a plurality of teeth 632 that can be coupled to the wall 630. The planet carrier 612 can include a plurality of teeth 640. The shifting collar 616 can be splined to the output spindle 618 to permit the shifting collar 616 to be coupled for rotation with the output spindle 618 but permit the shifting collar 616 to be moved axially relative to the output spindle 618.

With regard to the upper half of FIG. 23, the transmission 600 may be operated in a first speed ratio in which a collar 650 couples the first ring gear 608 to a structure, such as a housing 652, to inhibit rotation of the first ring gear 608 relative to the housing 652. Simultaneously, the shifting collar 616 can be moved into a position in which the teeth 622 of the shifting collar 616 are engaged to the teeth 632 of the second ring gear 610. The sun gear 602, first planet gears 604 and first ring gear 608 cooperate to cause the second planet gears 606 to rotate at a first rate, which drives the second ring gear 610 and in turn, drives the shifting collar 616 to cause the transmission 600 to operate in a low speed ratio.

With regard to the lower half of FIG. 23, the transmission 600 may be operated in a second speed ratio in which the collar 650 couples the second ring gear 610 to the housing 652 to inhibit rotation of the second ring gear 610 relative to the housing 652. Simultaneously, the shifting collar 616 can be moved into a position in which the teeth 620 of the shifting collar 616 are engaged to the teeth 640 of the planet carrier 612, while the teeth 622 are disengaged from the teeth 632. The sun gear 602, first planet gears 604, second planet gears 606 and second ring gear 610 cooperate to cause the planet carrier 612 to rotate at a second rate, which drives the shifting collar 616 to cause the transmission 600 to operate in a high speed ratio.

Figure 24:
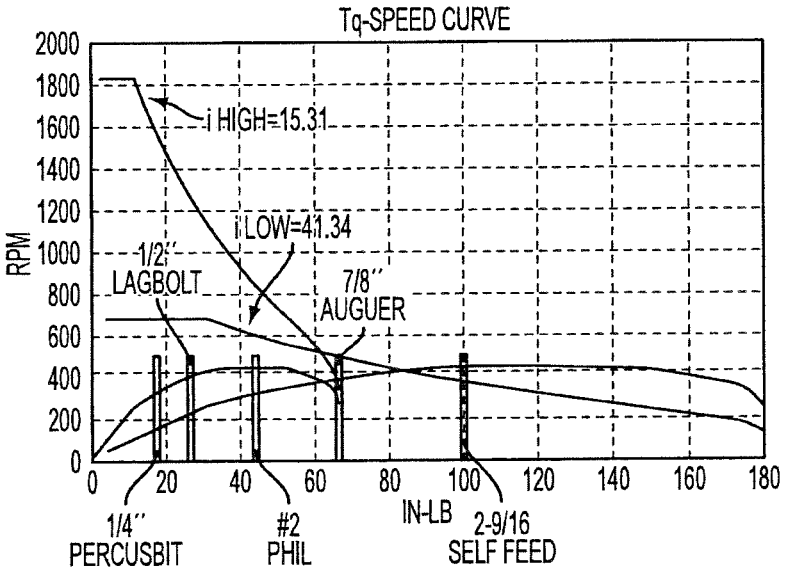
FIG. 24 is a plot illustrating the rotational speed of the output of the hybrid impact tool of FIG. 1 as a function its output torque operating at two different speed settings and using two different motor control schemes.

With reference to FIG. 24, a plot illustrating a relationship between the torque and rotational speed of the output of the hybrid impact tool 8 (FIG. 1). It will be appreciated that the trigger controller 52 (FIG. 3) can be equipped with circuitry for controlling the distribution of electrical power to the motor 70 (FIG. 3) according to two or more schemes and that the hybrid impact tool 8 (FIG. 1) can be instrumented to permit a user to select a desired scheme. For example, each of the schemes can be employed to select a duty cycle of the electrical power that is provided to the motor 70 (FIG. 3) via a pulse-width modulation technique. A first duty cycle having a relatively large ratio of on-time relative to the total time of the duty cycle can be employed to rotate the output of the hybrid impact tool 8 (FIG. 1) at a relatively high speed, and a second duty cycle having a relatively smaller ratio of on-time relative to the total time of the duty cycle can be employed to rotate the output of the hybrid impact tool 8 (FIG. 1) at a relatively lower speed. Combining electronic speed control with the multi-speed capabilities of the reduction gearset 100 (FIG. 3) can provide the hybrid impact tool 8 (FIG. 1) with four (or more) distinct rotational speeds that may be selected as desired to complete various tasks. It will be understood that various different types of motors may be better suited to different types of control techniques. In some situations, a brushless DC motor, such as an IMP type brushless DC motor, may be employed for the motor 70 (FIG. 3) to provide enhanced motor control.

Figure 25:
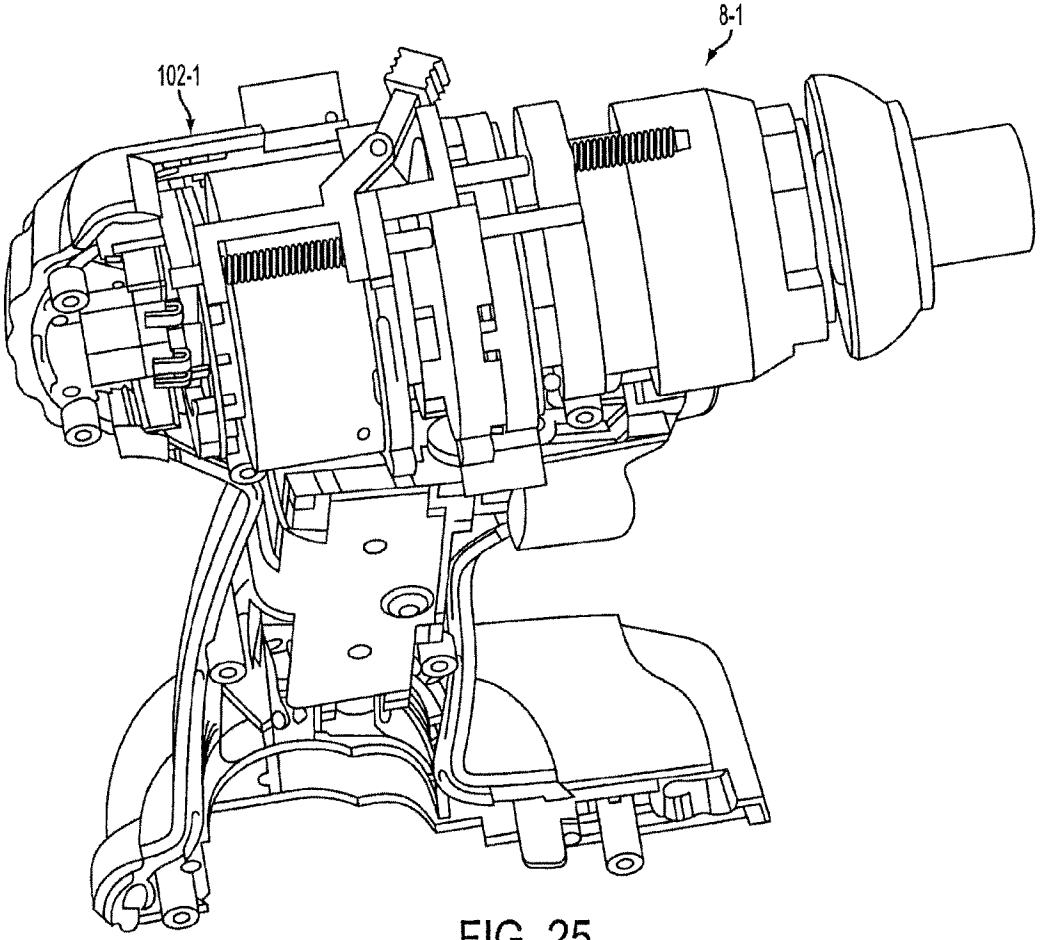
FIG. 25 is a perspective, partly broken away view of another hybrid impact tool constructed in accordance with the teachings of the present disclosure.
Figure 26:
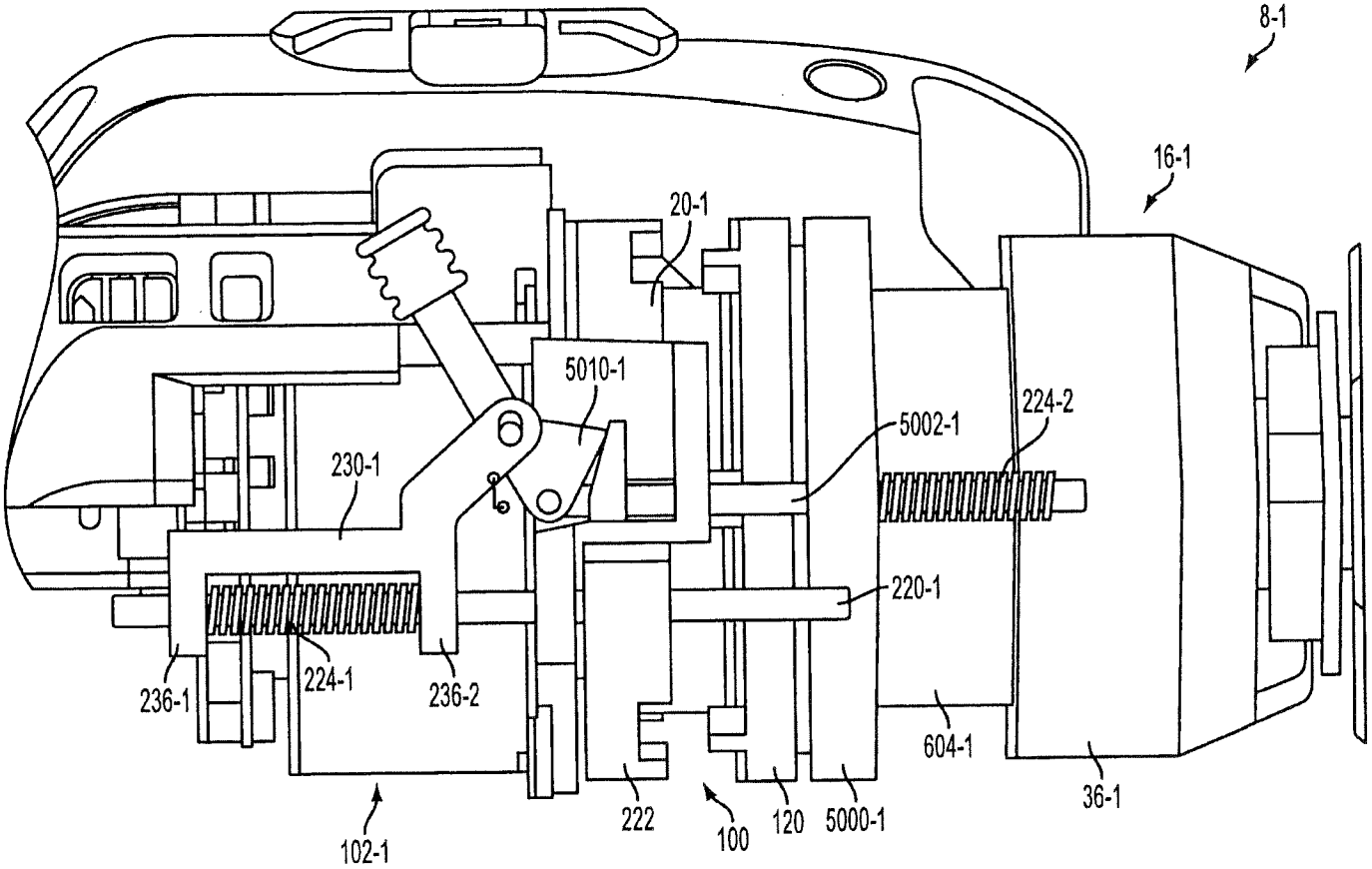
FIG. 26 is a top plan, partly broken away view of the hybrid impact tool of FIG. 25 as set in drill mode that operates a reduction gearset at a first speed ratio.
Figure 27:
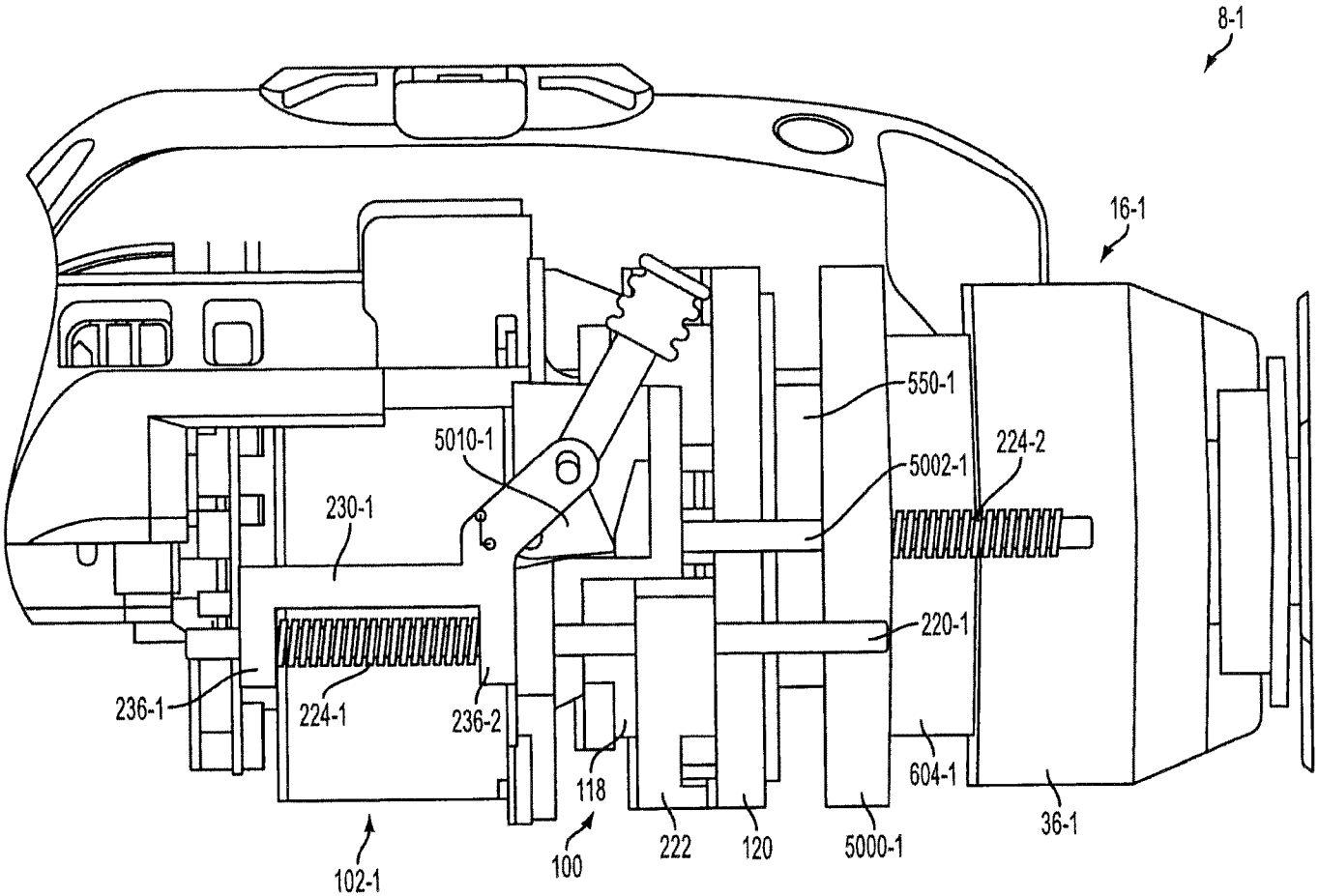
FIG. 27 is a top plan, partly broken away view of the hybrid impact tool of FIG. 25 as set in an impact mode that operates a reduction gearset at a second speed ratio.

With reference to FIGS. 25-27, another hybrid impact tool constructed in accordance with the teachings of the present disclosure is indicated by reference numeral 8-1. The hybrid impact tool 8-1 can be identical to the hybrid impact tool 8 of FIG. 1 except as described herein. More specifically, the speed selector 102-1 includes a plate structure 230-1 that is coupled to the shift cam 5010-1 of the mode change mechanism 20-1. The plate structure 230-1 can define a pair of bushings 236-1 and 236-2, which can be slidably mounted on a rail 220-1 and a biasing spring 224-1 can be received between the bushings 236-1 and 236-2 and fixed to the rail 220-1 at a predetermined location (such as at a mid-point of the stroke of the plate structure 230-1). Pivoting movement of the shift cam 5010-1 is employed to cause corresponding movement of a shaft 5002-1 to move a shift fork 5000-1 and a mode collar 604-1 as is described in the above-referenced Provisional patent application. Briefly, the shift fork 5000-1 can be moved between a first position to engage mode collar 604-1 to both the input spindle 550-1 (FIG. 27) of the impact mechanism 16-1 and the hammer 36-1 of the impact mechanism 16-1, and a second position to disengage the mode collar 604-1 from the hammer 36-1 of the impact mechanism 16-1. A spring 224-2 can bias the shift fork 5000-1 toward a desired position.

Pivoting movement of the shift cam 5010-1 also causes corresponding sliding motion of the plate structure 230-1 on the rail 220-1 to compress the biasing spring 224-1 against one of the bushings 236-1 and 236-2 depending on the direction in which the shift cam 5010-1 is moved. As the rail 220-1 is fixedly coupled to the collar 222, it will be appreciated that pivoting movement of the shift cam 5010-1 will effect a change in the gear ratio of the reduction gearset 100. It will further be appreciated that the biasing spring 224-1 permits the plate structure 230-1 to be moved without a corresponding movement of the collar 222 in situations where the collar 222 is not aligned to either the first ring gear 118 or the second ring gear 120.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A power tool comprising:

a housing;

a motor coupled to the housing, the motor having an output shaft;

an output member;

a power transmitting mechanism drivingly coupling the output shaft to the output member, the mechanism comprising a transmission having dual planetary stage with a sun gear, a first planet gear, a second planet gear, a planet carrier, a first ring gear and a second ring gear, the first and second planet gears being rotatably mounted on the planet carrier, the first planet gear being disposed between the motor and the second planet gear and having a pitch diameter that is smaller than a pitch diameter of the second planet gear, the first ring gear being meshingly engaged with the first planet gear, and the second ring gear being meshingly engaged with the second planet gear; and a shift mechanism having a collar that is non-rotatably but axially slidably coupled to the housing for movement between a first position and a second position, wherein the collar comprises an annular collar body, a first set of external splines and a second set of external splines, the collar body being received about the first ring gear, the first set of external splines extending radially inwardly from the collar body and engaging a third set of external splines formed about the first ring gear when the collar is in the first position to thereby inhibit rotation of the first ring gear relative to the housing, the second set of external splines being coupled to an end of the collar body that faces opposite the motor, the second set of external splines engaging a fourth set of external splines formed on the second ring gear when the collar is in the second position to thereby inhibit rotation of the second ring gear relative to the housing.

2. The power tool of claim 1, wherein the power transmitting mechanism comprises a rotary impact mechanism having an input spindle and an anvil, the input spindle being coupled for rotation with an output of the transmission, the output member being coupled for rotation with the anvil.

3. The power tool of claim 1, wherein the shift mechanism further comprises a switch member and a pair of springs, the springs cooperating to bias the collar into a neutral position relative to the switch member.

4. The power tool of claim 3, wherein the shift mechanism further comprises a rod that is fixedly coupled to the collar, the switch member being movably mounted on the rod.

5. The power tool of claim 4, wherein the springs are mounted on the rod on opposite sides of the switch member.

6. The power tool of claim 1, wherein the first and second planet gears are unitarily formed.

7. The power tool of claim 6, wherein the first planet gear has a first quantity (Q1) of teeth, the second planet gear has second quantity of teeth (Q2) and wherein the quotient of the quantity of teeth on the second planet gear divided by the quantity of teeth on the first planet (Q2/Q1) gear is not an integer.

8. The power tool of claim 7, wherein a timing aperture is formed in at least one of the first and second planet gears, the timing aperture being indexed at a predetermined angle relative to a timing tooth on one of the first and second planet gears.

9. A power tool comprising:

a housing;

a motor coupled to the housing, the motor having an output shaft;

an output member;

a power transmitting mechanism drivingly coupling the output shaft to the output member, the mechanism comprising a transmission having dual planetary stage with a sun gear, a compound planet gear, a planet carrier, a first ring gear and a second ring gear, the compound planet gear being rotatably mounted on the planet carrier and having first and second planet gears that are fixedly coupled to *and integrally formed with* one another, the first planet gear being disposed between the motor and the second planet gear and having a pitch diameter that is smaller than a pitch diameter of the second planet gear, the first ring gear being meshingly engaged with the first planet gear, and the second ring gear being meshingly engaged with the second planet gear, wherein the first planet gear has a first quantity (Q1) of teeth, the second planet gear has second quantity of teeth (Q2) and wherein the quotient of the quantity of teeth on the second planet gear divided by the quantity of teeth on the first planet (Q2/Q1) gear is not an integer; and a shift mechanism with a collar that is non-rotatably but axially slidably coupled to the housing for movement between a first position and a second position, wherein the collar non-rotatably couples the first ring gear to the housing in the first position and non-rotatably couples the second ring gear to the housing in the second position.

10. The power tool of claim 9, wherein a timing aperture is formed in at least one of the first and second planet gears, the timing aperture being indexed at a predetermined angle relative to a timing tooth on one of the first and second planet gears.

11. A power tool comprising:

a housing;

a motor in the housing, the motor including an output shaft;

a planetary transmission having a sun gear, a plurality of first planet gears, a first ring gear and a carrier, the sun gear being driven by the output shaft, the first planet gears being driven by the sun gear and having teeth that are meshingly engaged to teeth of the first ring gear, the carrier including a rear carrier plate and a front carrier plate between which the first planet gears are received, the rear carrier plate including a first bearing aperture;

a first bearing received in the first bearing aperture and being configured to support the output shaft; and a second bearing received onto the rear carrier plate to support the carrier relative to the housing.

12. The power tool of claim 11, wherein the planetary transmission includes a plurality of second planet gears.

13. The power tool of claim 12, wherein each of the first planet gears is coupled for rotation with a corresponding one of the second planet gears.

14. The power tool of claim 13, wherein each of the first planet gears has a first pitch diameter and each of the second planet gears has a second pitch diameter that is larger than the first pitch diameter.

15. The power tool of claim 13, wherein the first ring gear includes a plurality of external teeth that are axially spaced apart from the teeth that are meshingly engaged by the teeth of the first planet gears.

16. The power tool of claim 15, wherein the external teeth are positioned at least partly vertically in-line with at least one of the first and second bearings.

17. The power tool of claim 15, further comprising an axially slidable collar that is movable between a first position, in which the collar is engaged to the external teeth of the first ring gear, and a second position in which the collar is engaged to a second ring gear that is meshingly engaged to the second planet gears.

18. The power tool of claim 17, wherein the collar is non-rotatably coupled to the housing.

19. The power tool of claim 18, further comprising a switch member, a first spring [(224)] and a second spring, the first spring [(224)] being compressed when the switch member is moved from a first switch position to a second switch position without a corresponding movement of the collar from the first position to the second position, the second spring being compressed when the switch member is moved from the second switch position to the first switch position without a corresponding movement of the collar from the second position to the first position.

*20. The power tool of claim 11, wherein the second bearing is engaged to a bearing support plate that is received in the housing.*

*21. The power tool of claim 11, wherein the second bearing is substantially axially aligned with the first bearing.*

*22. The power tool of claim 11, wherein the rear carrier plate comprises an annular structure with a first portion and a second portion, the first portion having a larger diameter than the second portion.*

*23. The power tool of claim 22, wherein the first portion abuts against a rear surface of the first planet gears.*

*24. The power tool of claim 22, wherein the second portion receives the first bearing therein.*

*25. The power tool of claim 24, wherein the second bearing is received onto the second portion.*

*26. The power tool of claim 11, wherein the output shaft has a front end portion supported axially forward of the motor by the first bearing and a rear end portion supported axially rearward of the motor by a third bearing received in a rear mount of the housing.*

*27. The power tool of claim 11, further comprising an output spindle configured to be rotationally driven by rotation of the carrier.*

*28. The power tool of claim 27, further comprising an impact mechanism disposed between the carrier and the output spindle, wherein the carrier rotationally drives the output spindle via the impact mechanism.*

*29. The power tool of claim 28, wherein the impact mechanism has an input spindle that is coupled for rotation with the front carrier plate.*

*30. The power tool of claim 27, further comprising a chuck coupled for rotation with the output spindle.*

*31. The power tool of claim 11, wherein the sun gear is coupled for rotation with the output shaft axially forward of the first bearing.*

*32. The power tool of claim 11, further comprising a controller configured to control distribution of electrical power to the motor.*

*33. The power tool of claim 32, wherein the controller is configured to select between at least a first control scheme and a second control scheme based on a user input, wherein, in the first control scheme, the controller causes rotation of the motor at a first rotational speed, and in the second control scheme, the controller causes rotation of the motor at a second rotational speed that is lower than the first rotational speed.*

*34. The power tool of claim 33, wherein the housing is instrumented to receive the user input of a selection between the first control scheme and the second control scheme.*

*35. The power tool of claim 33, wherein, in the first control scheme, electrical power is provided to the motor by a pulse-width-modulation signal having a relatively large ratio of on-time relative to the total time of the duty cycle, and, in the second control scheme, electrical power is provided to the motor by a pulse-width-modulation signal having a relatively smaller ratio of on-time relative to the total time of the duty cycle.*

*36. A power tool comprising:*

*a housing;*

*a motor in the housing, the motor including an output shaft having a forward end portion and a rear end portion;*

*a planetary transmission having a sun gear, a plurality of planet gears, a ring gear and a planet gear carrier, the sun gear being driven in rotation by the output shaft, the plurality of planet gears being driven in rotation by the sun gear and having teeth that are meshingly engaged to teeth of the ring gear, and the carrier being driven in rotation by motion of the planet gears, the carrier defining a first bearing aperture;*

*an impact mechanism having an input shaft that is fixedly coupled for rotation with the carrier and an output spindle;*

*a first bearing received in the first bearing aperture and being configured to support the forward end of the output shaft; and*

*a second bearing received onto the carrier to support the carrier relative to the housing.*

*37. The power tool of claim 36, wherein the carrier comprises a rear carrier plate axially rearward of the planet gears and a front carrier plate axially forward of the planet gears.*

*38. The power tool of claim 37, wherein the first bearing aperture is defined in the rear carrier plate axially rearward of the planet gears.*

*39. The power tool of claim 36, wherein the second bearing is engaged to a bearing support plate that is received in the housing.*

*40. The power tool of claim 36, wherein the second bearing is substantially axially aligned with the first bearing.*

*41. The power tool of claim 36, wherein the rear end portion of the motor shaft is supported axially rearward of the motor by a third bearing received in a rear mount of the housing.*

*42. The power tool of claim 36, further comprising a controller configured to control distribution of electrical power to the motor.*

*43. The power tool of claim 42, wherein the controller is configured to select between at least a first control scheme and a second control scheme based on a user input, wherein, in the first control scheme, the controller causes rotation of the motor at a first rotational speed, and in the second control scheme, the controller causes rotation of the motor at a second rotational speed that is lower than the first rotational speed.*

*44. The power tool of claim 43, wherein the housing is instrumented to receive the user input of a selection between the first control scheme and the second control scheme.*

*45. The power tool of claim 43, wherein, in the first control scheme, electrical power is provided to the motor by a pulse-width-modulation signal having a relatively large ratio of on-time relative to the total time of the duty cycle, and, in the second control scheme, electrical power is*

*provided to the motor by a pulse-width-modulation signal having a relatively smaller ratio of on-time relative to the total time of the duty cycle.*

* * * * *